W. CONAN.
PIPE AND TUBE.
APPLICATION FILED MAR. 6, 1914.
1,123,099.
Patented Dec. 29, 1914.
FIG. 1. FIG. 2.
FIG. 3. FIG. 4.
FIG. 5.
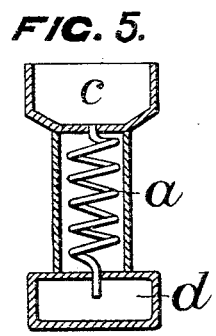
Witnesses:
Inventor
Walter Conan

# UNITED STATES PATENT OFFICE.

WALTER CONAN, OF DALKEY, IRELAND.

PIPE AND TUBE.

1,123,099.  Specification of Letters Patent.  Patented Dec. 29, 1914.

Application filed March 6, 1914. Serial No. 822,923.

*To all whom it may concern:*

Be it known that I, WALTER CONAN, a subject of the King of Great Britain, residing at Ard na Chree, Dalkey, county of Dublin, Ireland, have invented certain new and useful Improvements in Pipes and Tubes, of which the following is a specification.

This invention proposes improved means for preventing the occurrence of air-locks and similar obstructions in pipes, or tubes, such as the feed pipes of hot water installations, the petrol supply pipes to the carbureters of motor cars, motor car radiator tubes, or other pipes, tubes or conduits carrying or used for the passage of fluid or liquid; and the invention consists in forming the pipe or tube with a core so that the cross section of the opening becomes annular or approximately so, depending upon the configuration of the core.

The core may be solid or hollow, rigid or flexible, and of a suitable diameter to pass into the tube; the diameter of the core relatively to that of the tube being adjusted as may be desirable or necessary according to the particular application of the invention. The pipe or tube and the corresponding core may however be extruded together, one within the other.

It has been ascertained that it is possible to coil a pipe or tube, provided with a core as above described, into any desired shape or shapes, whether regular or not, and that even when arranged in the most complicated manner there is no tendency for an air-lock or other obstruction to form when a fluid or liquid is passed through the pipe, said fluid or liquid flowing with perfect regularity from the exit end of the pipe as soon as sufficient pressure has been attained to carry it over the highest point in the tube.

Pipes or tubes with cores may be manufactured in accordance with the invention of any cross sectional configuration required to suit any particular installation or circumstance, and the core may be concentric or eccentric to the tube and may also be single or multiple.

Several forms which the pipes or tubes constructed in accordance with this invention may take are illustrated by way of example in Figures 1 to 4 inclusive of the accompanying drawings wherein each form is shown in cross section. Fig. 5 is a diagrammatic cross section of a device to illustrate the passage of a liquid or fluid from one container to another through a cored tube or pipe.

As will be seen on reference to Fig. 1, the pipe $a$ may be of the usual circular form and the core $b$ may be solid and of a corresponding form to that of the pipe and arranged within same so that an annular space is left between it and the pipe. Or, the core $b$ may be cruciform in section as shown in Fig. 2. The tube $a$ may be of rectangular section if desired, and in such a case the core $b$ may be of a corresponding section, either hollow or solid, or may be of cruciform section, as illustrated in Figs. 3 and 4 respectively.

The cored pipe or tube may be wound in any desired fashion and it is shown in Fig. 5 in the form of a simple helix, in which case the pipe $a$ connects an open receptacle $c$ with a closed receptacle $d$. When it is desired to pass, say, a liquid from the receptacle $c$ to the receptacle $d$, for any purpose, it will be found on the liquid being placed or poured into the receptacle $c$ that on sufficient pressure or head being obtained and notwithstanding that the receptacle $d$ may be full of air or gas such as would resist the flow of fluid through an ordinarily constructed tube, said liquid will flow approximately down or around the one side of the core within the tube while the air or gas within the receptacle $d$ simultaneously escapes by way of the remaining space between the core and tube which is not filled with the liquid, thus totally eliminating any tendency to an air-lock and ensuring a constant and uniform flow of the liquid. Thus, in the use of the pipe, there will be a column of liquid flowing in one direction along the core, *e. g.*, downwardly, and a column of air or gas surrounding said column of liquid and flowing in an opposite direction, *e. g.*, upwardly, between the same and the inner circumferential surface of the pipe.

In addition to the application above referred to, the invention may also be utilized in connection with barometers and thermometers, water tube boilers, radiators and in fact in any case where a fluid or a liquid is to be conveyed from one point to another, or where a liquid is required to be rapidly volatilized.

What I claim is:—

In combination, a liquid-conducting pipe and a core arranged therein and following the outline thereof, the core being longitudinally continuous and co-extensive with said pipe and being spaced at all points from the inner circumferential surface of said pipe and serving to define, in conjunction with the pipe, a circumferentially and longitudinally continuous liquid passage of generally annular cross-section, whereby in the use of the pipe a column of liquid substantially filling the pipe will descend in one direction along the surface of the core and any entrained gas or air will flow in an opposite direction in surrounding relation to said column of liquid.

In testimony whereof I have hereunto set my hand in presence of two subscribing witnesses.

WALTER CONAN.

Witnesses:
  HARRY JOHN STOGDEN,
  W. E. ROGERS.

Copies of this patent may be obtained for five cents each, by addressing the "Commissioner of Patents, Washington, D. C."